United States Patent
Ribes Marti

(10) Patent No.: US 8,646,155 B2
(45) Date of Patent: Feb. 11, 2014

(54) CLIPS FOR FASTENING ACCESSORIES TO VEHICLE PANELS

(75) Inventor: Oscar Ribes Marti, Barcelona (ES)

(73) Assignee: Illinois Tool Works Inc., Glenview, IL (US)

( * ) Notice: Subject to any disclaimer, the term of this patent is extended or adjusted under 35 U.S.C. 154(b) by 189 days.

(21) Appl. No.: 13/254,972

(22) PCT Filed: Mar. 1, 2010

(86) PCT No.: PCT/US2010/025723
§ 371 (c)(1),
(2), (4) Date: Sep. 6, 2011

(87) PCT Pub. No.: WO2010/101803
PCT Pub. Date: Sep. 10, 2010

(65) Prior Publication Data
US 2011/0314646 A1 Dec. 29, 2011

(30) Foreign Application Priority Data
Mar. 6, 2009 (ES) .................................. 200900630

(51) Int. Cl.
*A44B 21/00* (2006.01)
*F16B 5/06* (2006.01)
*F16B 2/24* (2006.01)

(52) U.S. Cl.
USPC ............................................. 24/295

(58) Field of Classification Search
None
See application file for complete search history.

(56) References Cited

U.S. PATENT DOCUMENTS

| | | | | |
|---|---|---|---|---|
| 2,521,317 A | * | 9/1950 | Waara | 24/294 |
| 2,958,914 A | * | 11/1960 | Krach | 24/453 |
| 2008/0028577 A1 | * | 2/2008 | Soman et al. | 24/293 |
| 2008/0084050 A1 | | 4/2008 | Volkmann et al. | |

OTHER PUBLICATIONS

ISR for PCT/US2010/025723 dated Jun. 18, 2010.

\* cited by examiner

*Primary Examiner* — Jack W. Lavinder
(74) *Attorney, Agent, or Firm* — Lowe Hauptman & Ham, LLP

(57) ABSTRACT

A clip for fastening accessories to vehicle panels includes a rectangular reinforcement case which is formed by the end contact of its opposite mid parts, by means of the fitted-together join of a single finger per side of each mid part, by means of a shape approximately of a double fold in the form of a zig-zag against the edge of the opposite part, which extends in parallel to the walls of the case and in the interior of the case. The remainder of this opposite part has a symmetrical finger with a similar arrangement.

9 Claims, 4 Drawing Sheets

CLIPS FOR FASTENING ACCESSORIES TO VEHICLE PANELS

RELATED APPLICATIONS

The present application is national phase of PCT/US2010/025723 filed Mar. 1, 2010, and claims priority from Spanish Application Number 200900630, filed Mar. 6, 2009.

FIELD OF THE INVENTION

The present invention develops some improvements to clips for fastening accessories to vehicle panels, especially the clips which are used in mechanisms of the airbag type, wherein the resilient response of the clip has been improved in relation to the panel in which it is inserted, and its reaction to the expansive forces of the airbag has been improved.
Antecedents Top clips are known for securing different accessories to the panels of motor vehicles. These panels have a window into which there is inserted the catch or clip in question, which remains wedged in the panel by means of flexible fins.

In the known designs, clips of this type have flexure arms which act as levers against the panel. In order to be installed, their resilient resistance to deformation must be overcome, which, because of their rigidity, constitutes a certain amount of difficulty when they are being fitted in the panel.

As will be explained hereinafter in this description, the disadvantage described is associated with the nature of the known flexure arms, and overcoming this problem is one of the fields to which the improvements constituted by the invention apply.

The known clips, to which the present invention makes the improvements which characterize it, have four confining flanges, the function of which is to form a closed cube which, when the forces associated with the expansion of the airbag are applied to the clip, continues to have an intact geometric structure, thus preventing the part as a whole from being deformed.

Deformation of this type, which is a consequence for example of the tremendous lateral forces to which the part is subjected when the airbag is deployed, makes the part unusable, and impedes enormously its removal and extraction of the clip, for the reinstallation of the said airbag mechanism. This makes the operation of replacing the said airbags more difficult once they have been used, and makes it even more costly.

In the known art, this cube is formed by joining its flanges together in pairs, interlacing its fingers, and fitting together its hollows. However, this structure inevitably permits play between the parts, with this play working against the purpose of the said reinforcement case, thus providing a deficient result which facilitates the deformation of the clip assembly, and the complications described which are inherent in the latter.

The objective of the present invention is to eliminate these disadvantages. These inventive objects pursued, and others, will become more apparent from the description of the invention which is provided hereinafter.

BRIEF DESCRIPTION OF THE INVENTION

The present invention makes some improvements to clips for fastening accessories to motor vehicle panels, wherein the said clips comprise a base to which there are connected by their respective ends vertical supports which bear respective resilient securing structures in the form of flexible fins made of an appropriate material, with a generally conical configuration which facilitates their insertion.

In the area of the said vertical supports, in the vicinity of the base of the clip, there is a case for reinforcement against lateral forces, which, in the present invention, is formed by means of the joining of two mid parts, the edges of which have symmetrical double folds, one for each edge and side, and which face one another, thus making possible a union which forms the case, which is secure and has no separation play.

In addition, the flexure arms which act against the panel on its upper part, clamping it together with the aforementioned lower flexible fins, have a fold which permits extension of the arms in a direction different from the original one, for example more or less opposite the original direction, thus giving rise in general to an increase in the length of the arms and the length of their flexure lever, as well as to an increase in their resilient response to their flexure.

This therefore fulfils the objectives of the present invention.

BRIEF DESCRIPTION OF THE DRAWINGS

For better understanding of it, the invention is accompanied by a sheet of drawings, which are provided purely by way of non-limiting illustrative example.

FIG. 1 shows in perspective a top clip according to the known art, which is designed for airbag mechanisms.

FIG. 2 is an elevated view of the clip in the preceding figure.

FIG. 3 is a partial view of the clip in the preceding figures, showing the case element of the said clip, in perspective and in isolation.

FIG. 4 is a plan view in cross-section of the preceding figure.

DETAILED EXPLANATION OF THE INVENTION

Figure 1:
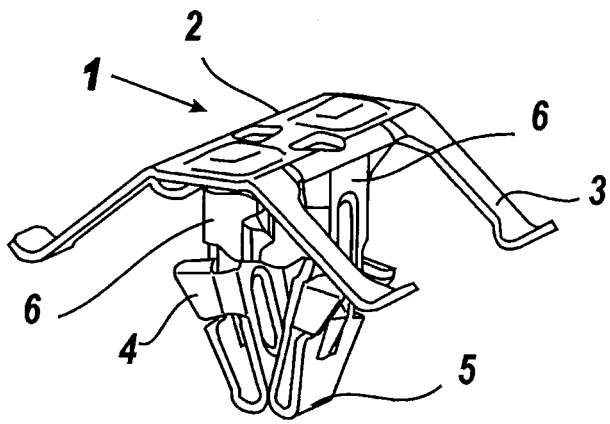
FIGS. 1 to 4 are all representations of the known art. The parts which represent the clip and do not form part of the object of the present invention are shown by way of example, without making any claim for them.
Figure 2:
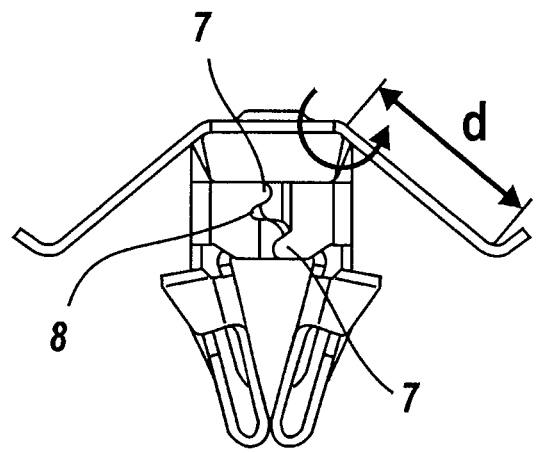
Figure 3:
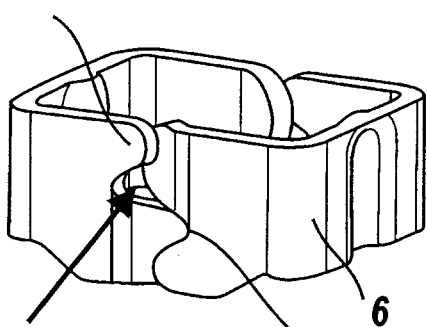
Figure 4:
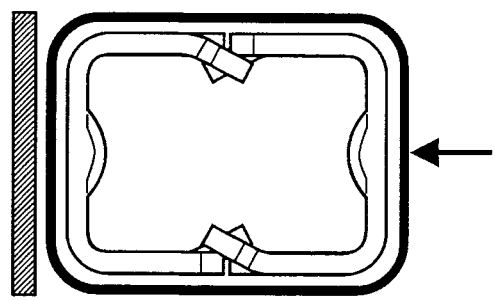

The present invention provides some improvements to clips 1 for fastening accessories to vehicle panels, especially those which are used with airbags, of the type formed by stamping a plate made of metal or another appropriate material to form an approximately rectangular base 2, from which there extends on both of its opposite sides a resilient securing structure in the form of flexible fins 4 with a generally conical configuration, comprising for example a descending upper fin which is extended in the inverse direction in order to form a second, ascending lower fin 5.

This clip 1 has in the area immediately adjacent to the said base 2 a rectangular reinforcement case 6 which is formed by the end contact of its opposite mid parts.

Starting from the ends of the said base 2, this clip 1 also has in each case flexure arms 3 which act resiliently on the securing panel.

As previously stated, the applications of the clips, the improvements of which form the subject of the present invention, can suffer, when the airbag is deployed, from enormous lateral forces which tend to deform the structure of the flexible fins of the clip. In order to eliminate this effect, in the known art there has been construction of a case 6 formed by two halves obtained by stamping the part and the material in the vicinity of these flexible fins 4.

In order to provide the case thus formed with stability, in the known art there has been joining of the edges of its two mid parts, where there is connection (see FIGS. 1 to 4, and especially 2 and 3) of profiles in which there are formed larger and smaller fingers separated by a hollow, which are joined symmetrically to the mid part opposite. The larger finger 7 is folded slightly in one direction, and the opposite, smaller finger is not folded. The embedding would take place when the hollows 8 according to this solution came into contact, the interlacing of these fingers being a means for providing the join.

In practice, because of the production tolerance of these parts, and essentially because of the form itself of these parts involved, a perfect join between the mutual hollows 8 of these two mid parts which form the reinforcement case 6 is not produced, and there is an area of separation or play between the two halves concerned.

It should be pointed out that the existence of this play constitutes a great disadvantage for the efficiency and work of the clips concerned, since when a strong and virtually instantaneous lateral impact occurs, it makes possible lateral deformation of the flexible fin assembly 4 of the clip of the reinforcement case 6 itself, the mid parts of which then do not interlace in the planned manner, thus increasing globally even further the deformation of the clip, and giving rise to serious deterioration of the part, which cannot be extracted simply, and also leaving the clip useless for future reuse.

According to one of the improvements of the present invention, this reinforcement case 6 is produced in such a way that the two mid parts which form it come into contact with one another without permitting any play, thus resulting in a more secure and efficient join.

Figure 5:
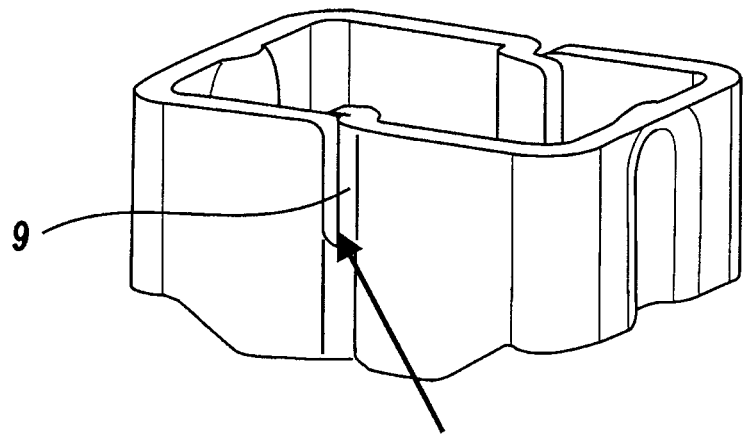
FIGS. 5 and 6 are similar to the views in the preceding FIGS. 3 and 4, except that they represent improvements which are characteristic of the present invention.
Figure 6:
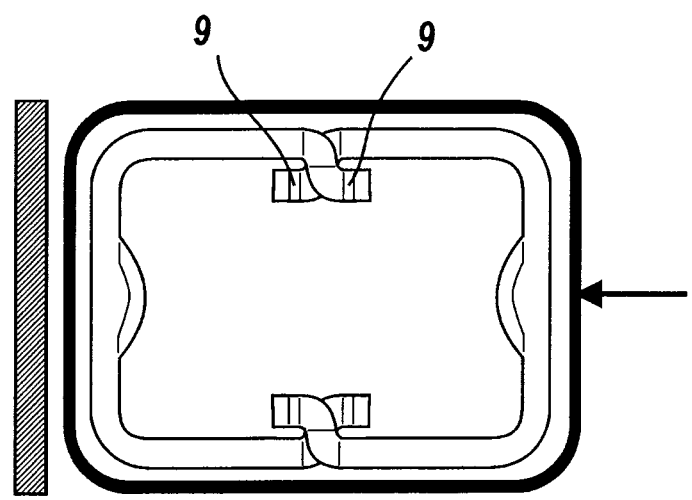
Figure 7:
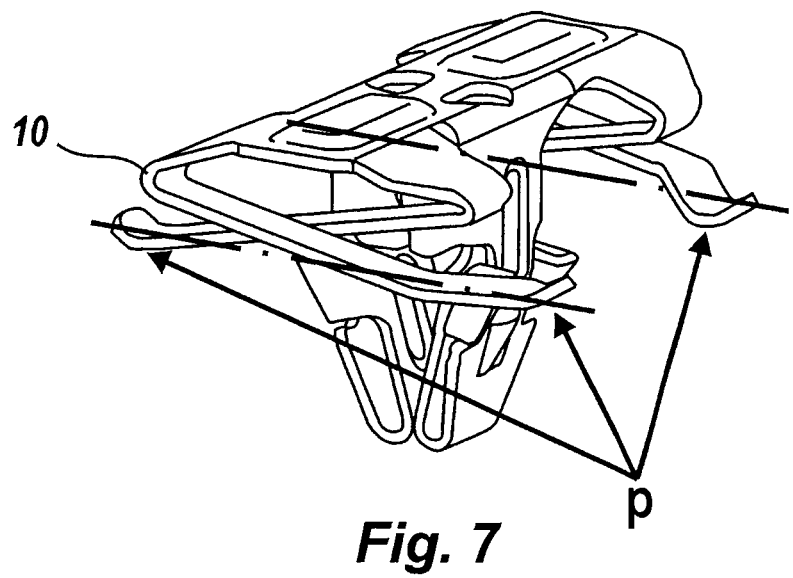
FIGS. 7 and 8 show respectively, in perspective and seen from the front, a clip which incorporates the characteristics of the present invention in one of its possible embodiments.

FIGS. 5 and 6 show an embodiment of these improvements, in which the said rectangular case 6 is formed by means of the fitted-together join of a single finger per side of each mid part, formed by means of a shape approximately of a double fold in the form of a zig-zag, which extends in parallel to the walls of the case and in the interior of the latter 6, against the edge of the opposite part. This finger is situated at the back of the opposite flange, edge or wall, looking at the clip 1 from the exterior.

For its part, the remainder of this opposite part has a finger of a similar type which fits against the edge of the other part, thus creating a case by means of the joining of its two mid parts, the folds of which, which are symmetrical relative to a horizontal mid plane, are inserted in parallel in the inner surfaces of the cube 6.

Since each double fold 9 out of the four which exist in this embodiment acts against the edge of the mid part opposite, there is no occurrence of the previously described play according to the known art, or of its undesirable effects. The joining is assured by the symmetrical interlacing of these fingers 9, one for each side and mid part which forms the case 6.

Another one of the improvements developed by the present invention includes providing a fold 10 of the flexure lugs 3 of the clip 1 which permits extension of these lugs 3 in the direction opposite the initial one, wherein they tend to cross in pairs.

Figure 8:
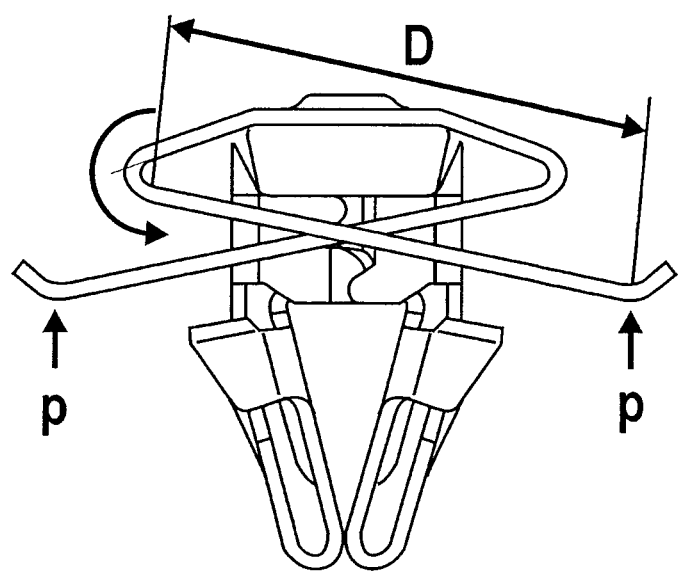

The consequence of this structure is that it makes it possible to increase the length of these lugs 3 and the lever which provides their flexure. It can be seen in FIG. 2, which represents the prior art, that if the length of these flexure arms is "d", in the embodiment in FIG. 8 this length, "D", is now far greater. This provides the part with a larger lever arm, and ultimately with greater flexibility, which facilitates its installation, thus obtaining one of the objectives planned for the invention.

These flexure arms 3 have been constructed in such a way that their inner interlacing takes place without areas of contact. Their ends can have folds 8 which tend to avoid aggressive contact of this portion of the part against the panel.

Figure 9:
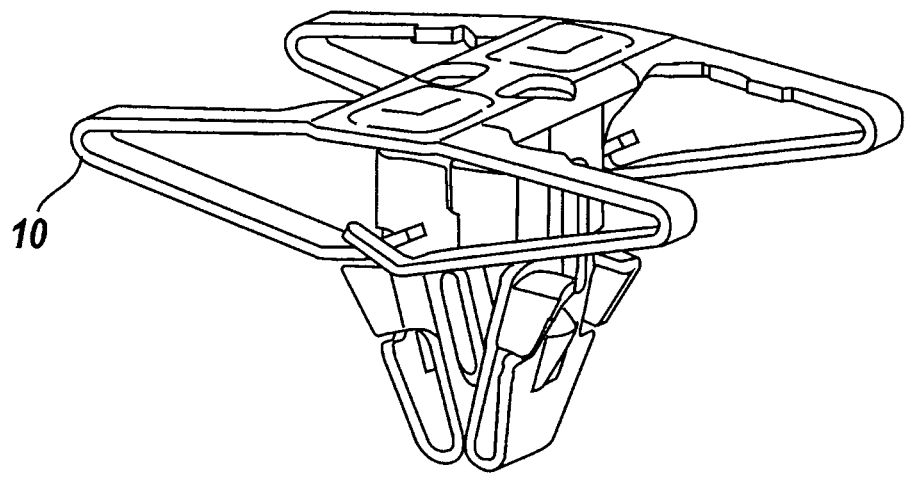
FIGS. 9 and 10 represent views similar to those in FIGS. 7 and 8, and constitute another possible embodiment of a clip according to the improvements provided by the present invention.
Figure 10:
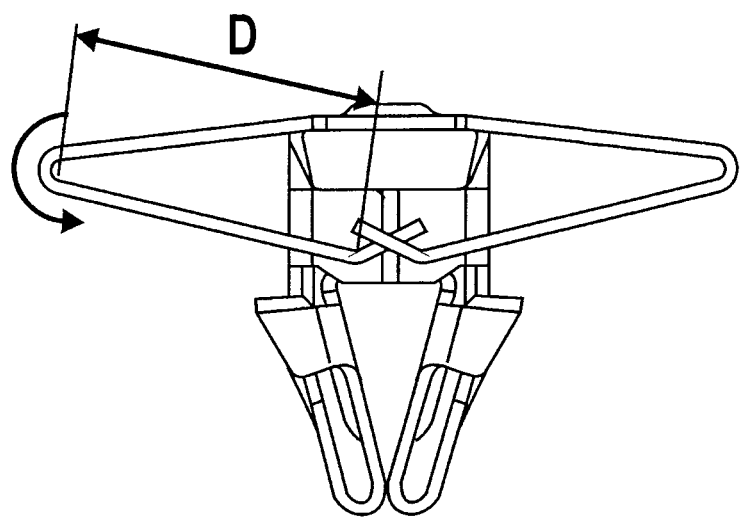

Comparison of the embodiments shown in FIGS. 7 to 10 shows that the improvements developed by the present invention can be incorporated in different final parts, all of which are included in the essence claimed for the invention. For example, FIGS. 9 and 10 show an embodiment in which the support points "p" of these flexure arms 3 are located approximately in the mid area of the interior of the clip 1, whereas in FIGS. 7 and 8, these support points "p" of the said flexure arms 3 are more distant from the center of the clip 1.

It is understood that in the present case, any details of finishing or form which do not alter the essence of the invention may be varied.

The invention claimed is:

1. An improvement to clips for fastening accessories to vehicle panels formed by stamping a plate made of metal to form an approximately rectangular base, from which there extends on opposite sides a resilient securing structure in the form of flexible fins, said improvement comprising a descending upper fin which is extended in an inverse direction in order to form a second ascending lower fin having in an area immediately adjacent to said base a rectangular reinforcement case which is formed by an end contact of opposite mid parts, there being provided, starting on said opposite sides of said base, in each case flexure arms which act resiliently on a panel, wherein the said rectangular reinforcement case is formed by means of a fitted-together join of a single finger per side of each mid part, formed by means of a shape approximately of a double fold in the form of a zig-zag against an edge of the opposite mid part, which extends in parallel to walls of the rectangular reinforcement case and in the interior of the rectangular reinforcement case, wherein the fingers form a symmetrical interlacing at the mid parts; and wherein the flexure arms have a fold which permits extension of said flexure arms inwardly in a direction which converges toward the clip.

2. The improvement to clips for fastening accessories to vehicle panels, as claimed in claim 1, wherein the said flexure arms have their surface configured in such a way as to avoid lateral contact between said flexure arms which face one another.

3. The improvement to clips for fastening accessories to vehicle panels, as claimed in claim 1, wherein the said flexure arms have at their ends folds or curves which are designed to avoid areas of contact with the surface of the panel.

4. The improvement to clips for fastening accessories to vehicle panels, as claimed in claim 1, wherein said flexure arms converge and extend to support points spaced from said center of the clip.

5. The improvement to clips for fastening accessories to vehicle panels, as claimed in claim 1, wherein the said flexure arms converge toward a center of said clip and extend to a point supporting said clip approximately adjacent to the mid area of the clip.

6. A clip for securing a component to a panel, comprising: a base having a substantially quadrilateral shape and configuration formed from a pair of substantially U-shaped elements secured to one another, each U-shaped element having a pair of free ends each having a finger extending away and inwardly from a wall thereof, wherein in securing said first and said second substantially U-shaped elements at least one of said fingers on each side extends on top of the finger of the other one of the U-shaped elements parallel to said wall, a plurality of flexure arms attached to said base, wherein each flexure arm includes a first element attached to and extending away from said base and a second element integral with said first element extending in a direction towards said base.

7. The clip for securing a component to a panel according to claim 6, wherein said second element of each flexure arm includes a curved free end.

8. The clip for securing a component to a panel according to claim 6, wherein said second element of each flexure arm includes a support point spaced from a center of said clip.

9. The clip for securing a component to a panel according to claim 6, wherein said second element of each flexure arm includes a support point positioned adjacent to a center point of said clip.

\* \* \* \* \*